United States Patent [19]

Wang et al.

[11] Patent Number: 5,606,003
[45] Date of Patent: Feb. 25, 1997

[54] PRIMERLESS URETHANE ADHESIVE COMPOSITIONS

[75] Inventors: Chia L. Wang, Hudson; Arden E. Schmucker, Alliance; Fred V. Sandels, Hartville; Richard H. Harshbarger, Monroe Falls; Robert L. Spencer, Lyndhurst, all of Ohio

[73] Assignee: GenCorp Inc., Fairlawn, Ohio

[21] Appl. No.: 299,790

[22] Filed: Sep. 1, 1994

[51] Int. Cl.$^6$ ................................................. C08G 18/10
[52] U.S. Cl. ............................ 528/60; 528/72; 528/905; 525/63; 524/706; 428/422.8; 428/423.1
[58] Field of Search ........................ 528/60, 72, 905; 525/63; 524/706; 428/422.8, 423.1

[56] References Cited

U.S. PATENT DOCUMENTS

| | | | |
|---|---|---|---|
| 3,442,827 | 5/1969 | Friedman | 521/169 |
| 3,714,127 | 1/1973 | Fabris et al. | 528/44 |
| 3,786,030 | 1/1974 | Rice | 528/53 |
| 3,823,201 | 7/1974 | Pizzini et al. | 524/762 |
| 3,886,122 | 5/1975 | Fabris et al. | 528/53 |
| 3,931,450 | 1/1976 | Patton et al. | 156/306 |
| 3,980,594 | 9/1976 | Fabris et al. | 521/129 |
| 4,011,180 | 3/1977 | Lockwood et al. | 521/115 |
| 4,040,992 | 8/1977 | Bechara et al. | 521/117 |
| 4,166,889 | 9/1979 | Fujii et al. | 521/55 |
| 4,247,676 | 1/1981 | Kimball | 528/49 |
| 4,261,877 | 4/1981 | Vogt et al. | 524/444 |
| 4,336,298 | 6/1982 | Schwarz | 428/285 |
| 4,452,944 | 6/1984 | Dawdy | 525/126 |
| 4,496,706 | 1/1985 | Chang | 528/57 |
| 4,716,210 | 12/1987 | Trummelmeyer et al. | 528/75 |
| 4,728,710 | 3/1988 | Goel | 528/58 |
| 4,742,113 | 5/1988 | Gismondi et al. | 524/762 |
| 4,743,672 | 5/1988 | Goel | 528/44 |
| 4,778,844 | 10/1988 | Blount | 524/706 |
| 4,876,308 | 10/1989 | Melby et al. | 524/780 |
| 4,923,756 | 5/1990 | Chung et al. | 428/423.7 |
| 4,931,487 | 6/1990 | Priester, Jr. et al. | 521/163 |
| 5,002,806 | 3/1991 | Chung | 427/385.5 |
| 5,162,162 | 11/1992 | Yasuda et al. | 428/694 |
| 5,164,473 | 11/1992 | Dormish et al. | 528/44 |
| 5,175,228 | 12/1992 | Wang et al. | 528/48 |
| 5,340,901 | 8/1994 | Wang | 528/60 |
| 5,354,609 | 10/1994 | Wang | 428/317.5 |

FOREIGN PATENT DOCUMENTS

| | | |
|---|---|---|
| 743156 | 9/1966 | Canada . |
| 772670 | 11/1967 | Canada . |
| 0010411 | 4/1980 | European Pat. Off. . |
| 0063534 | 10/1982 | European Pat. Off. . |
| 0081729A1 | 6/1983 | European Pat. Off. . |
| 0248254 | 12/1987 | European Pat. Off. . |
| 0349838 | 1/1990 | European Pat. Off. . |
| 837120 | 6/1960 | United Kingdom . |
| 2077741 | 12/1981 | United Kingdom . |

OTHER PUBLICATIONS

"Chemical Degradation of Polyurethane," V. Gajewski, 33rd Annual Polyurethane Technical Marketing Conference, Sep. 30–Oct. 3, 1990.

"Polyurethane Elastomers with Hydrolytic and Thermooxidative Stability I. Polyurethanes with N–Alkylated Polyamide Soft Blocks," Journal of Polymer Science, Part A: Polymer Chemistry, vol. 28, pp. 1473–1482 May (1990).

"Polyurethane Elastomers with Hydrolytic and Thermooxidative Stability. II. Polyurethanes with N–Alkylated Polyurethane Soft Blocks," Journal of Polymer Science: Part A: Polymer Chemistry, vol. 28, pp. 3685–3699 Dec. (1990).

"Mechanisms of Thermal Decomposition in Totally Aromatic Polyurethanes," S. Foti, P. Maravigna, and G. Montaudo, Journal of Polymer Science: Polymer Chemistry Edition, vol. 19, pp. 1679–1687 Jul. (1981).

"An Investigation of the Thermolysis Mechanism of Model Urethanes," K. J. Voorhees, F. D. Hileman, I. N. Einhorn and J. H. Futrell, Journal of Polymer Science: Polymer Chemistry Edition, vol. 16, pp. 213–228 Jan. (1978).

"Thermal Stability of Isocyanate–Based Polymers. 2. Kinetics of the Thermal Dissociation of Model Urethane, Oxazolidone, and Isocyanurate Block Copolymer," P. I. Kordomenos, J. E. Kresta, and K. C. Frisch, Macromolecules, vol. 20, pp. 2077–2083 Sep. (1987).

"Thermal Stability of Isocyanate–Based Polymers. 1. Kinetics of the Thermal Dissociation of Urethane, Oxazolidone, and Isocyanurate Groups," P. I. Kordomenos and J. E. Kresta, Macromolecules, vol. 14, pp. 1434–1437 Sep.–Oct. (1981).

"Side Reactions in the Formation of Polyurethanes: Stability of Reaction Products of Phenyl Isocyanate," M. Spirkova, M. Kubin, and K. Dusek, J. Macromol Sci.–Chem., A27(4), pp. 509–522 Apr. (1990).

"Mechanism of Thermal Degradation of Polyurethanes Investigated by Direct Pyrolysis in the Mass Spectrometer," A. Ballistreri, S. Foti, P. Maravigna, G. Montaudo, and E. Scamporrino, Journal of Polymer Science: Polymer Chemistry Edition, vol. 18, pp. 1923–1931 Jun. (1980).

"Thermal Degradation of N–Substituted Polycarbamates," Elizabeth Dyer and Richard J. Hammond, Journal of Polymer Science: Part A, vol. 2, pp. 1–14 Jan. (1964).

"Thermal Degradation of the Polyurethane from 1,4–Butanediol and Methylene Bis(4–Phenyl Isocyanate)," N. Grassie and M. Zulfiqar, Journal of Polymer Science: Polymer Chemistry Edition, vol. 16, 1563–1574 Jul. (1978).

European Search Report EP 95 30 6148 date Jul. 26, 1996.

*Primary Examiner*—Rachel Gorr
*Attorney, Agent, or Firm*—Robert F. Rywalski; Samuel B. Laferty

[57] ABSTRACT

A two-component urethane adhesive is disclosed which requires no primer or pretreatment of the substrate. The adhesive in cured form has superior paint adhesion and can withstand high temperature bake cycles without substantial losses in adhesion to the substrate. The adhesive differs from prior adhesives in that essentially all of the high molecular weight polyols in the prepolymer component are the reaction product grafting reactions of acrylonitrile onto polypropylene polyols.

21 Claims, No Drawings

PRIMERLESS URETHANE ADHESIVE COMPOSITIONS

FIELD OF INVENTION

The present invention relates to a primerless, urethane adhesive compositions made from a prepolymer component and a curative component. The adhesive may contain trimerization catalysts, phosphorus adhesion promoters, grafted polyols, catalysts for the reaction of hydroxyls with isocyanates, molecular sieves, and inert fillers such as talc. Depending on the additives the adhesive composition may have retention of adhesive properties after high temperature aging. Desirably, at least one substrate is a fiber reinforced thermoset unsaturated polyester or generally fiber reinforced plastics (FRP). The adhesives disclosed, using acrylonitrile grafted polyols, have surfaces to which paints and their primers are more effectively adhered.

BACKGROUND

Urethane adhesives are used for bonding automotive fiberglass reinforced parts. One such adhesive is U.S. Pat. No. 4,876,308 to Melby et al. which teaches that an NCO:(OH+NH) ratio of at least 1.2 and desirably 1.35 is advantageous to eliminate the need for primers. U.S. Pat. No. 5,175,228 to Wang et al. also relates to urethane adhesives. It additionally teaches that phosphorus adhesion promoters and isocyanate trimerization catalysts in adhesives with a NCO:(OH+NH) ratio of at least 1.2 can result in better adhesion after high temperature bakes. The trimerization catalyst is assumed to trimerize the excess unreacted isocyanates. A drawback with these compositions was the lack of adhesion of certain paints or primers to any exposed adhesive after part assembly and cure.

It is the object of this invention to provide an adhesive that better retains paint. Another object of the invention is to provide a urethane adhesive having primerless adhesion and high temperature resistance when the equivalent ratio of NCO:(OH+NH) is below 1.2.

SUMMARY OF THE INVENTION

Disclosed are two-component urethane adhesives generally containing a prepolymer component and a curative component. The curative may contain phosphorous polyols and/or trimerization catalysts. The preferred embodiments show primerless adhesion and resistance to deterioration at high temperatures under conditions such as 204° C. for 60 min. The curative may beneficially contain isocyanate trimerization catalysts even though the NCO:(OH+NH) ratio is desirably below 1.2 or 1.0. The polyols in the pre-polymer (base) are desirably grafted polyols (polypropylene polyol which has grafted poly-acrylonitrile, such as Niax™ 31-28). The adhesive made with a polypropylene polyol with grafted acrylonitrile also has improved paint adhesion. Adhesives with the trimerization catalysts and NCO:(OH+NH) ratios below 1.2 are preferred for parts that will be painted with a powder coating.

DETAILED DESCRIPTION

Prior art adhesives used NCO:(OH+NH) ratios above 1.2 where excess isocyanate groups resulted in improved adhesion to fiber reinforced thermoset substrates. These excess isocyanate groups however may give the composition increased moisture sensitivity. The excess isocyanate groups may react with moisture yielding $CO_2$ gas and amine groups. Therefore the preferred NCO:(OH+NH) ratios in this invention are brought lower and near 1.2 or below. The ratios may go below 1 and still result in desirable adhesive compositions.

The urethane system of the present invention is initially an uncured two part composition which contains a base component having a urethane prepolymer and a curative component. The prepolymer component is made from a polyol intermediate and a large equivalent excess amount of a polyisocyanate so that free NCO groups exist in the prepolymer. Such free NCO groups can exist on the ends of the urethane prepolymer or as unreacted polyisocyanates, etc. The prepolymer component can also contain various conventional additives or fillers discussed more fully herein below.

A two-component adhesive normally uses one or more medium molecular weight polyols of number average molecular weight from about 600 to 10,000, more desirably from 1,000 to 8,000 or 9,000 reacted with an excess of a polyisocyanate to form a prepolymer for the adhesive. The base for the adhesive comprises the prepolymer along with fillers, viscosity modifiers and urethane reaction catalysts etc. In the curative one or more low molecular weight polyols of number average molecular weight from about 200 to 1000 and more desirably from 200 to less than or about 600 is optionally used. Desirably these are tri, tetra or higher functionality polyols. The low molecular weight polyols may be used in the prepolymer but the predominant polyol (e.g. greater than 80, 90 or 95 wt. of the prepolymer is desirably a medium molecular weight polyol. Amine or polyamine reactants and additional medium molecular weight polyol may be included in amounts such as less than 10 or 20 wt. % based on all the polyols of the curative to adjust the molecular weight between crosslinks or to give a more viscous adhesive.

The medium molecular weight polyols of the prepolymer properly chosen can contribute to increased adhesion to the substrate at various NCO:(OH+NH) ratios. One preferred medium molecular weight polyol is poly(alkylene oxide) grafted with monomers comprising acrylonitrile other ethylenically unsaturated monomers.

Another preferred medium molecular weight polyol is dispersion of urea in medium molecular weight polyols.

Adhesive compositions are disclosed which use as the predominant polyol in the prepolymer component a reaction product of poly(alkylene oxide) polyol grafted with at least acrylonitrile. The adhesives made from this polyol have improved adhesion to the substrate after high temperature baking operations at temperatures such as 204° C. for one hour. The adhesives made with this polyol also have improved paint adhesion after high temperature baking. A further improvement found with these polyols is that one can lower the NCO:(OH+NH) ratio in the final adhesive to one and lower and still achieve good adhesive properties without the necessity of phosphorus based adhesion promoters although adhesion promoters may be included. If additional high temperature stability is desired a trimerization catalyst may be included.

The polyol intermediate taught in the prior art may be used in this invention. However, for the preferred embodiment it is desirable that the predominant polyols of the prepolymer base (i.e., at least 80, 90, 95, or 100 wt. % of the polyols of 600 or 1,000 to 10,000 number average molecular weight or higher) more desirably 3,000 to 9,000 are the reaction product of grafting acrylonitrile onto poly(alkylene oxide) polyols. These polymers desirably include 5 to 40 wt.

% and more desirably 10 to 30 wt. % repeat units from acrylonitrile, based on the combined weight of grafted polyol and the polymers from acrylonitrile.

The grafted polyols are made by grafting monomers desirably comprising acrylonitrile and other ethylenically unsaturated monomers of 2 to 10 carbon atoms and optionally one or more heteroatoms to poly(alkylene oxide) polyols under free radical grafting conditions. Not all of the monomers polymerized are grafted onto the polyols. These ungrafted polymers are retained with the grafted polymers and are included in the weight percents represented. Acrylonitrile is desirably at least 50, 80, 90, 95 or 99% of the total ethylenically unsaturated monomers. Incorporated by reference to further explain this technology are U.S. Pat. Nos. 3,823,201 and 4,742,113.

These are believed to be formed by free radically grafting reactions between ethylenically unsaturated monomers, a polyol, and a free radical source at temperatures, of 20° C. and above. The polyols before grafting may have some unsaturation therein due to side reactions that are known to occur during the polymerization of cyclic alkylene oxides. The polyols may also have additional purposefully added unsaturation from incorporation of unsaturated cyclic alkylene oxides or chemical compounds with unsaturated groups and carboxyl or hydroxyl reactive groups. U.S. Pat. No. 3,823,201 prefers 0.10 to 0.70 moles of unsaturation per mole of polyol although lower and higher amounts of unsaturation in polyols for grafting reactions are disclosed.

A preferred and commercially available graft polymer is Niax™ 31-28 based on poly(propylene oxide). Additional nongrafted polymers from acrylonitrile may be present but it is observed that added polyacrylonitrile does not enhance strength and undesirably promotes phase separation of the polyacrylonitrile from the polyol. It is known that the commercially available materials contain ungrafted polymers from acrylonitrile. The polyols before grafting are desirably triols of number average molecular weights from 600 or 1,000 to 10,000, more desirably from 3,000 to 9,000. These polyols are desirably partially (e.g. greater than 60, 70, 80, 90 or 95 mole %) or fully end capped with ethylene oxide. They desirably have a high percentage (i.e., greater than 60, 70, 80, or 90 mole percent) of primary hydroxyl groups from said ethylene oxide. Being polyfunctional polyols with desirable functionality greater than 2, they have one or more repeat units derived from molecules other than propylene oxide.

Other polyols used in small amounts in the prepolymer base or in large amounts in the curative are as described in the next paragraph.

The polyol intermediate is generally a liquid polyether polyol or a polyester polyol, or combinations thereof, desirably having primary hydroxy groups and having a number average molecular weight of from about 400 to about 10,000 and desirably from about 2,000 to about 9,000. A wide range of polyether or polyester polyols can be used in making the adhesives of the present invention such as diols, triols, tetrols, and the like.

Polyether polyols are generally made by reacting an alkylene oxide having from 2 to 10 carbon atoms such as propylene oxide with a strong base such as potassium hydroxide, preferably in the presence of water, glycols and so forth. Polyether polyols can also be made by ring opening polymerization of tetrahydrofuran or epichlorohydrin using acid catalysts. Except for polyols made from ethylene oxide or polytetrahydrofuran, to obtain primary hydroxyl end groups, they are generally end capped with ethylene oxide.

Examples of polyethers which can be utilized are those which are produced as by polymerization of tetrahydrofuran or epoxides (such as ethylene oxide, propylene oxide, butylene oxide, styrene oxide, or epichlorohydrin), or by addition of epoxide compounds (preferably ethylene oxide or propylene oxide), alone, in a mixture, or in succession, to starting components with reactive hydrogen atoms such as water, polyhydric alcohols, ammonia or polyfunctional amines. Grafted polyether polyols such as those grafted with styrene or acrylonitrile can also be utilized. A preferred polyether intermediate is a polypropylene ether diol or triol containing primary hydroxyl end groups.

Polyethers having multiple hydroxyl groups and highly branched chains are readily prepared from alkylene oxides and initiators having an active hydrogen functionality greater than two. The higher functionality initiators that are useful with the alkylene oxides include polyols, polyamines and amino alcohols having a total of three or more reactive hydrogen atoms on hydroxyl and primary or secondary amino groups and generally having up to 12 carbon atoms. Suitable polyols include triols, such as glycerol, trimethylolpropane, butanetriols, hexanetriols, trialkanolamines, various diethylenetriamines, such as erythritol and pentaerythritol; pentols, hexols, such as dipentaerythritol and sorbitol; as well as alkyl glucosides, carbohydrates, polyhydroxy fatty acid esters such as castor oil; and polyoxy alkylated derivatives or polyfunctional compounds having three or more reactive hydrogen atoms, such as, the reaction product of trimethylolpropane, glycerol and other polyols with ethylene oxide, propylene oxide or other epoxides or copolymers thereof, e.g., copolymers of ethylene and propylene oxides, with ethylene oxide being used in a molar amount of not over 20 mol percent as compared to other alkylene oxides like propylene oxide. Examples of higher functionality amino alcohols and polyamine initiators include ethanolamine, diethanolamine, triethanolamine, isopropanolamine, diisopropanolamine, triisopropanolamine, 2-(2-aminoethylamino)ethanol, 2-amino-2(hydroxymethyl)-1,3-propanediol, ethylenediamine, diethylenetriamine, triethylenetetramine, and urea as well as various aryl polyamines such as 4,4',4"-methylidynetrianiline.

Polyester polyols are typically formed from the condensation of one or more polyhydric alcohols having from 2 to 15 carbon atoms with one or more polycarboxylic acids or their anhydrides having from 2 to 14 carbon atoms. Examples of suitable polyhydric alcohols include the following: ethylene glycol, propylene glycol such as 1,2-propylene glycol and 1,3-propylene glycol, glycerol; pentaerythritol; trimethylolpropane; 1,4,6-octanetriol; butanediol; pentanediol; hexanediol; dodecanediol; octanediol; chloropentanediol, glycerol monoallyl ether; glycerol monoethyl ether, diethylene glycol; 2-ethylhexanediol-1,4; cyclohexanediol-1,4; 1,2,6-hexanetriol; 1,3,5-hexanetriol; 1,3-bis-(2-hydroxyethoxy)propane and the like. Cyclic ethers with desirably 2 to 15 carbon atoms may be used instead, but they are more expensive to use. Examples of polycarboxylic acids include the following: phthalic acid; isophthalic acid; terephthalic acid; tetrachlorophthalic acid; maleic acid; dodecylmaleic acid; octadecenylmaleic acid; fumaric acid; aconitic acid; trimellitic acid; tricarballylic acid; 3,3'-thiodipropionic acid; succinic acid; adipic acid; malonic acid, glutaric acid, pimelic acid, sebacic acid, cyclohexane-1,2-dicarboxylic acid; 1,4-cyclohexadiene-1,2-dicarboxylic acid; 3-methyl-3,5-cyclohexadiene-1,2-dicarboxylic acid and the corresponding acid anhydrides, acid chlorides and acid esters such as phthalic anhydride, phthaloyl chloride and the dimethyl ester of phthalic acid. Preferred polycarboxylic acids are the aliphatic and cycloaliphatic dicarboxylic acids containing no more than 14 carbon atoms and the aromatic dicarboxylic acids containing no more than 14 atoms. Any polyhydric alcohol having more than 2 hydroxyl groups or any polycarboxylic acid having more than 2 carboxylic groups used to make the polyesters should be used in only very minor amounts to prevent crosslinking and gelling.

In order to achieve specific properties which are influenced by the composition and content of polyurethane hard blocks, small amounts of polyhydric alcohols are optionally utilized in combination with the above-noted liquid polyether or polyester glycol intermediates. The polyhydric alcohols are described in the preparation of polyester polyols. The amount of such polyhydric alcohols is generally from about 0 or 1 to about 40 parts by weight and preferably from about 0 or 1 to about 10 parts by weight based upon 100 parts by weight of the polyether polyols, the polyester polyols, or combinations thereof.

Polyesters from lactones (for example ε-caprolactone) and polyacetals, polycarbonates or polybutadienes containing terminal hydroxyl groups are also suitable.

Highly preferred polyol intermediates include polypropylene ether, and poly-1,2-butylene ether, which are end-capped so as to have primary hydroxyl end groups, as well as poly-1,4-tetramethylene ether, and epsilon-polycaprolactone diols.

The one or more polyisocyanates which are utilized generally have the formula $R(NCO)_n$ where n is an integer of 2, 3 or 4 with approximately 2 being preferred. However, it is to be understood that since combinations of various polyisocyanates can be utilized, the equivalent amount of isocyanate can vary and often n is not an integer. R is an aliphatic having from about 2 to about 20 carbon atoms with from about 6 to about 15 carbon atoms being preferred, an aromatic including an alkyl substituted aromatic having from about 6 to about 20 carbon atoms with from about 6 to about 15 carbon atoms being preferred, or combinations thereof. Aromatic diisocyanates and aliphatic substituted aromatic diisocyanates are desired since the aliphatic diisocyanates generally react too slow. Examples of suitable polyisocyanates include 1,6-diisocyanato hexane, 2,2,4- and/or 2,4,4-trimethyl hexamethylene diisocyanate, p- and m-tetramethyl xylene diisocyanate, dicyclohexylmethane-4, 4'-diisocyanate (hydrogenated MDI), 4,4-methylene diphenyl isocyanate (MDI), p- and m-phenylene diisocyanate, 2,4- and/or 2,6-toluene diisocyanate (TDI), durene-1,4-diisocyanate, isophorone diisocyanate, isopropylene-bis-(p-phenyl isocyanate) and sulfone-bis-(p-phenyl isocyanate). Examples of still other isocyanates include 1,5-naphthalene-diisocyanate, cumene-2,4-diisocyanate, 4-methoxy-1,3-phenylenediisocyanate, 4-chloro-1,3-phenylenediisocyanate, 4-bromo-1,3-phenylenediisocyanate, 4-ethoxy-1,3-phenylenediisocyanate, 2,4'-diisocyanatodiphenylether, 4,4'-diphenyldiisocyanate, 4,6-dimethyl-1,3-phenylenediisocyanate, 1,10-anthracenediisocyanate, 4,4'-diisocyanatodibenzyl, 3,3-dimethyl-4,4'-diisocyanatodiphenylmethane, 2,6-dimethyl-4,4'-diisocyanatodiphenyl and others and mixtures of the same. TDI is desirably utilized. The various diphenylmethane diisocyanates (MDI) and mixtures of MDI with polymeric MDI having an average isocyanate functionality of from about 2 to about 3.2 are preferred. Also useful are diisocyanates prepared by capping low molecular weight, that is less than 300, diols, ester diols or diamines with diisocyanates, such as the reaction products of one mole of 1,4-butanediol or bis-(4-hydroxybutyl)-succinate (molecular weight=262) with two moles of hexamethylene diisocyanate. Any combination of diisocyanates can also be employed. Combinations of slower reacting aliphatic with faster reacting aromatic diisocyanates can be advantageously used.

It is an important aspect of the present invention that free isocyanate, that is free NCO groups exist such as on the end of the prepolymer or on unreacted polyisocyanates, etc. Accordingly, the equivalent ratio of the isocyanate groups of polyisocyanate utilized to make the prepolymer to the hydroxyl groups of the polyol intermediate (NCO/OH) is generally from about 2 to about 50 or 75, desirably from about 10 to about 40, and preferably from about 10 to about 30.

Various additives known to the art and to the literature are generally contained within the base of the prepolymer component in conventional amounts. Generally additives are utilized which impart desired properties to the adhesive such as various antioxidants, various ultraviolet light inhibitors, thickening agents, and the like. Various fillers can also be utilized in conventional amounts and the same are known to the art and to the literature. Examples of fillers which are general mineral fillers, that is inorganic, and often in the powder form and which also serve to adjust the urethane prepolymer adhesive component viscosity include ground mica, talc, kaolin clay, calcium carbonate, calcium sulfite, colloidal silica, fumed silica, wollastonite, ballotini, hollow glass microspheres, glass, carbon and graphite fibers, various metallic oxides such as zinc, titanium zirconium, and the like, ground quartz, various metallic silicates, metallic powders such as lead, aluminum, bronze, and the like. A preferred filler is talc. The amount of filler is generally an effective amount to produce a viscosity so that the prepolymer component can be readily pumped through processing equipment such as adhesive meter-mixing machines. Such an effective amount is usually from about 5 to about 100 parts by weight and preferably from about 10 to about 50 parts by weight per 100 parts by weight of the prepolymer.

If it is desired that the polyurethane adhesive composition of the present invention have a color or hue, any conventional pigment or dye can be utilized in conventional amounts. Hence, any pigment known to the art and to the literature can be utilized as for example titanium dioxide, iron oxide, carbon black, and the like, as well as various dyes provided that they do not interfere with the various urethane reactions. The various pigments, dyes, etc., can also be utilized in either the prepolymer component, the curative component, or both.

The prepolymer component is generally made by adding the grafted polyol along with any other hydroxyl terminated polyol intermediates to a reactor along with the various other additives such as an antioxidant, a filler, and a shelf life stabilizer if the same is utilized in the prepolymer component, and the like. The reactor contents are then generally heated with the various ingredients therein mixed and a vacuum applied to remove moisture. The one or more polyisocyanates are added after moisture has been removed. In the absence of a catalyst, the formation of the prepolymer generally occurs at an elevated temperature as from about room temperature to about 150° C. with the specific temperature depending upon the specific type of hydroxyl terminated polyol and the specific type of one or more polyisocyanates. If a urethane catalyst is contained in the prepolymer component, the prepolymer reaction will occur at a lower temperature.

The curative component generally contains a polyol curing agent which generally serves as a cross linking agent, a primary amine, and an optional trimerization catalyst. The polyol curing agent is generally free of nitrogen and can be the same as the intermediate polyols. Hence, the above description of the intermediate polyol is hereby fully incorporated by reference including using small amounts (e.g. less than 30, 20, or 10 wt. % of the total polyols) of the before mentioned grafted polyols.

An essential requirement of the polyol of the curative component is that it be of a type such that a crosslinked polyurethane adhesive is formed upon cure of the adhesive composition. Thus, if the polyol intermediate and the polyisocyanate used to make the urethane prepolymer are essentially difunctional, the polyol curative should contain sufficient hydroxyls containing more than two OH groups per molecule so that a stable crosslinked network is formed when the curative is utilized. Alternatively, if either the intermediate polyol or the polyisocyanate used to make the prepolymer adhesive base has a functionality significantly greater than 2, the curative polyol may have a functionality of 2, or optionally greater than 2, to form the crosslinked network. Examples of curative polyols include a polyether or a polyester polyol having a number average molecular weight of from about 400 to about 10,000, desirably 2,000 to 9,000, such as the various above-noted polyol intermediates, or triols, tetrols, pentols, hexols, and the like, as noted above. A class of suitable polyols include the alkyl, aromatic, or alkyl substituted aromatic diols having from 2 to about 12 carbon atoms with from about 2 to about 8 carbon atoms being preferred. Another preferred class are the various polyhydric alcohols having from 3 to 15 carbon atoms and preferably from 3 to 10 carbon atoms and from 3 to 8 hydroxyl groups such as triols, tetrols, pentols, hexols, and the like with specific examples including glycerol, erythritol, pentaerythritol, arabitol, sorbitol, trimethylol propane, the various ethylene or propylene oxide adducts of trimethylol propane, glycerol, pentaerythritol, sorbitol, and the like.

Also included within the definition of polyols according to the concepts of the present invention are the various carbohydrates such as the various disaccharides and especially the monosaccharides, along with reaction products thereof with alcohols having from 1 to 5 carbon atoms such as for example alkyl glucoside, and the like. Examples of specific disaccharides include sucrose, lactose, and maltose. Examples of monosaccharides include the various penroses such as arabinose, xylose, lyxose, ribose, as well as the various hexoses such as glucose, gulose, mannose, galacrose, talose, allose, altrose, idose, fructose, sorbose, and the like. Of the various carbohydrates, the various alkyl glucosides with the alkyl group having from 1 to 12 carbon atoms are preferred.

The curative component also generally contains a primary aliphatic or aromatic amine which typically provides sag resistance after the prepolymer component is mixed with the curative component. The primary amine can be a di- or multifunctional primary amine having from about 1 to about 14 carbon atoms with from about 2 to about 8 carbon atoms being preferred. Examples of suitable primary amine compounds include diethylenetriamine, ethylenediamine, tetramethylenediamine, pentamethylenediamine, hexamethylenediamine, 2,5-diamine-n-hexane, xylene diamine, various naphthalene diamines such as 1,8-naphthalene diamine, and 1,3-diaminopropanol-2. The primary amine generally reacts with an equivalent amount of a free isocyanate group (NCO) in the prepolymer component to produce a polyurea. The reaction is generally very quick and the polyurea produced forms a strong hydrogen bonded network and significantly increases the viscosity of the mixed adhesive before cure and thereby provides sag resistance. An effective amount of the polyurea is thus utilized to prevent sag in the end product before cure thereof. Such an effective amount is generally from about 0.1 to about 5 parts by weight and preferably from about 0.5 to about 3 parts by weight per 100 parts by weight of the curative component.

An amount of the polyol curing or cross linking agent is utilized so that in association with the primary amine, the equivalent ratio of the free NCO groups of said prepolymer component to the curative OH +NH groups of the curative component is from about 0.60 to about 2.0, desirably from about 0.75 to about 1.35 and preferably from about 0.75 to about less than 1.0 or less than 1.20. The surface is treatment-free. By the term "treatment-free" it is meant that the substrate such as the FRP (fiber reinforced plastic) or the metal need not be treated whatsoever (1) mechanically as by sanding, abrading, etc., (2) with a solvent such as methylene chloride, acetone, toluene, and the like, or (3) with a chemical treatment such as through the use of various primers, isocyanates, or amines. The formed adhesive is utilized to bond or adhere FRP to FRP, FRP to a metal, FRP to a painted metal, and FRP to various plastic substrates as for example polyurethane, polyurea, nylon, polydicyclopentadiene, molded epoxy, molded thermoplastic polyesters, and the like.

An important aspect of the present invention is the optional utilization of trimerization catalysts which have been found to impart improved high temperature stability to the urethane adhesive as during high temperature paint bake of fiberglass reinforced parts, and the like. Trimer catalysts generally include quaternary ammonium salts. Trimerization catalysts normally trimerize any excess isocyanate groups present. Unexpectedly they also result in adhesives with high temperature resistance when the NCO:(OH+NH) ratio is below and slightly above 1:1.

Generally numerous types of trimerization catalysts can be utilized. A suitable catalyst are the various phosphines as generally represented by the formula

where $R^4$, $R^5$ and $R^6$, independently, is an alkyl having from 1 to 8 carbon atoms, with specific examples including triethyl phosphine, trimethyl phosphine, and the like.

Still another suitable trimerization catalyst are the various alkoxides as generally represented by the formula

where M is an alkali metal such as potassium, sodium, or lithium, or a borate, and $R^7$ is an alkyl having from 1 to 8 carbon atoms, with specific examples including

A still further suitable trimerization catalyst are the various metal oxides as generally represented by the formula

with a specific example being $Li_2O$.

Another suitable trimerization catalyst are the hydroxides of quaternary N,P,As,Sb, such as $C_6H_5CH_2N(CH_3)_{30}H$, and the like.

Another suitable trimerization catalyst are various organometallics containing Zn, Si, Sn, Pb, or Sb, and O, N or S with specific examples including $R'_3Si-SR''$, $R'_3Sn-SR''$, $R'_3Sn$-S-$SnR''_3$, $R'_3Sn$-OR", $R'_3Pb$-NR"$_2$, $R'_3Sb$-(OR")$_2$, $R'_3Sb$-(OCOR")$_2$, R'Zn-OR", R'Zn-NR"$_2$, $(C_4H_9)_2S_nO$, and the like, where R' and R", independently, is an alkyl, an aryl, or an alkenyl group having a total of from 1 to about 15 carbon atoms.

Another suitable trimerization catalyst are the various metal chelates such as diethyldipyridylnickel, bis(dipyridyl)nickel, tetrakis(triphenylphosphine)nickel, and the like.

Another suitable trimerization catalyst are the various hydrides such as $NaBH_4$ (sodium borohydride), $LiAlH_4$ (lithium aluminum hydride), sodium dihydrobis(2-methoxyethoxy) aluminum hydride, i.e.,

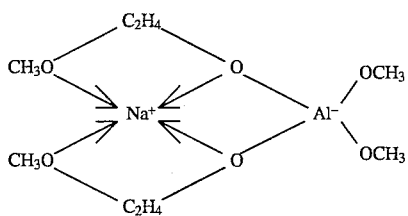

Another suitable trimerization catalyst are the various organic acids, inorganic acids, and Lewis acids, such as HCl, $(CO_2H)_2$, $AlCl_3$, and conventional Friedel-Crafts catalysts.

Another suitable trimerization catalyst are the various combination catalysts such as amines/epoxides, amines/alcohols, amines/alkylene carbonates, amines/alkylene imides, amines/carboxylic acids, amines/peroxides, ammonium hydroxides/carbamates.

Still another suitable trimerization catalyst are the a) sulfonium zwitterions as generally represented by the formula

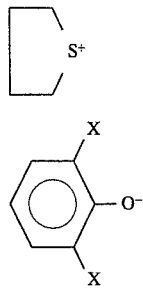

wherein X is H, Cl an alkyl group having from 1 to 10 carbon atoms, and b) amine-imide zwitterions as generally represented by the formula

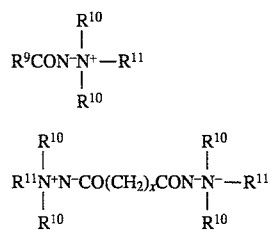

where x is from 2 to 16, $R^9$, and each $R^{10}$, independently, is an alkyl group having from 1 to 10 carbon atoms, and $R^{11}$ is $CH_2CH(OH)CH_3$, or $CH_2CH_2OH$.

Another suitable trimerization catalyst are the quaternary ammonium carboxylates as generally represented by the formula

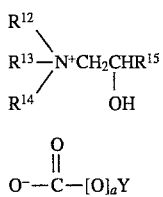

where a is 0 or 1, where $R^{12}$, $R^{12}$, $R^{14}$, independently, is alkyl or hydroxyalkyl of $C_{1-20}$, cycloalkyl of $C_{3-8}$, aralkyl, aryl, alkenyl of $C_{2-20}$, alkynyl of $C_{2-6}$, with alkyl $C_1$ to $C_4$ being preferred; $R^{15}$ is H, phenyl, alkyl of $C_{1-15}$, alkenyl of $C_{2-15}$, alkynyl of $C_{2-6}$, hydroxy alkyl of $C_{1-9}$, ketoalkyl of $C_{3-15}$, alkoxy alkyl of $C_{2-20}$, with alkyl $C_1$ to $C_4$ preferred, and where Y is H, alkyl of $C_{1-18}$, alkenyl of $C_{2-15}$, aromatic of $C_6$ to $C_{20}$ such as benzoate or methoxybenzyl, with alkyl $C_2$ to $C_{10}$ preferred.

A specific example of such a compound is TMR, manufactured by Air Products and Chemicals, Inc., which is trimethyl-2-hydroxypropyl ammonium 2-ethyl hexanoate. Related compounds include TMR-2, TMR-3, and TMR-4, wherein $R^{12}$, $R^{13}$ and $R^{14}$ is an alkyl independently having from 1 to 4 carbon atoms, $R^{15}$ is an alkyl having from 1 to 4 carbon atoms, and y is an alkyl having from 2 to 10, desirably 4 to 8 carbon atoms.

The quaternary ammonium carboxylates are preferred.

Other suitable trimerization catalysts include compounds such as
2,4,6 tris(dimethylaminomethyl)phenol
N,N',N" tris(dimethylaminopropyl)sym-hexahydrotriazine.

Examples of desirable trimerization catalyst include benzyl trimethylammonium hydroxide, benzyl trimethylammonium methoxide, potassium acetate, potassium ethoxide, potassium octoate, potassium phthalimide, sodium dihydrobis (2-methoxy ethoxy) aluminum hydride, sodium ethoxide, sodium methoxide, 2,4,6 tris(dimethylaminomethyl)phenol, N,N',N"tris(dimethylaminopropyl)sym-hexahydrotriazine, trimethyl-2-hydroxypropyl ammonium 2-ethyl hexanoate (TMR), and similar tertiary amines such as TMR-2, TMR-3 and TMR-4, which are trade secrets of Air Products, and tetramethylammonium-2-ethyl hexoate (TMAO), with trimethyl-2-hydroxypropyl ammonium 2-ethyl hexanoate being highly preferred.

The amount of a trimerization catalysts is generally from about 0.01 to about 1.0 percent by weight, desirably from about 0.02 to about 0.50 percent by weight, and preferably from about 0.02 to about 0.1 percent by weight based upon a total weight of the cure component.

The use of a urethane catalyst, which is generally a liquid, is optional. In combination with the trimerization catalysts, described above, urethane catalysts are desirably used to adjust open time or pot life of mixed adhesives. Typically, when a urethane catalyst is utilized, it is desirably utilized in the curative component, although it can also be utilized in the prepolymer component, or in both components. Suitable urethane catalysts include various tin catalysts known to the art and to the literature such as various stannous carboxylates such as stannous acetate, stannous octoate, stannous laurate, stannous oleate, and the like; or dialkyl tin salts of carboxylic acids such as dibutyltin diacetate, dibutyltin dilaurate, dibutyltin maleate, dibutyltin disulfide, dibutyltin di-2-ethylhexoate, dilauryltin diacetate, dioctyltin diacetate, or the like. Also, trialkyltin hydroxide, dialkyltin oxide, or dialkyltin chloride can be utilized. As an alternative or in addition to the above tin compounds, various tertiary amines can be used such as triethylamine, benzyldimethylamine, triethylenediamine and tetramethylbutanediamine. The tin catalysts, when utilized, are generally used in amounts of 0.5 parts or less, i.e., in the range of about 0.01 to 0.5 parts, by weight per 100 parts by weight of the component in which it is utilized such as the curative component. The tertiary amine catalysts, when utilized, can be used in amounts of 0.01 to about 5 parts by weight per 100 parts by weight of the component in which it is utilized such as the curative component. However, at least 0.01 part of at least one type of catalyst should be present. In addition to the above catalysts, organomercury or organic bismuth compounds can be utilized wherein the organic portion is an aliphatic and preferably an alkyl having from 2 to 20 carbon atoms. The amount is generally from about 0.01 to about 1.0 parts by weight per 100 parts by weight of the prepolymer or curative component. Desirably latent catalysts such as those described in U.S. Pat. No. 4,742,113, hereby incorporated by reference, which are substantially inactive until 150° or 200° F. are excluded from the adhesive.

The total weight of the curative component is generally equal or relatively similar to the total weight of the prepolymer component. Of course, it is to be understood that generally any weight ratio of the curative component to the urethane prepolymer component can be utilized so long as the equivalent ratio of free NCO groups in the prepolymer component to OH and NH groups of the curative component is within the above set forth ranges, and that the ratio of free NCO groups to the total OH groups of said hydroxy-terminated polyol intermediate, regardless of its location, is as set forth hereinabove.

Another important aspect of the present invention is that the two part urethane system contains a shelf life stabilizer so that generally the urethane catalyst and/or the trimerization catalyst are maintained in the stable condition. Generally, the shelf life stabilizer is desirably contained in the curative component although it can also be contained in the prepolymer component or both. A suitable shelf life stabilizer includes various molecular sieves such as crystalline potassium, sodium, or calcium aluminosilicares, various potassium, sodium, or calcium aluminophosphates, and the like. A specific example is Sylosiv 4Å, an approximately 4 Å sodium, calcium, or potassium aluminosilicate molecular sieve available from W. R. Grace Company. The amount of such shelf life stabilizers is generally from about 0.1 to about 15.0 percent by weight and preferably from about 0.5 to about 10 percent by weight based upon the weight of the curative component or system, or the prepolymer component or system.

Another important aspect of this invention is the use of optional phosphorus-type adhesion promoters which can be utilized in the curative component, although the same can be contained in the base component, or both, to prevent adhesion loss after the urethane adhesive is applied to a substrate or part which is subjected to high temperature bake as for example temperatures up to about 400° F. (204° C.) for 1 hour. The phosphorous type compounds are generally liquid and include various compounds which can be represented by the following formula

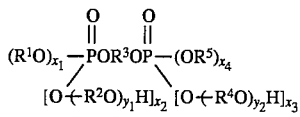 (Formula I)

where $R^1$, $R^3$, $R^5$, independently, is an alkyl having from 1 to 15 carbon atoms, wherein $R^2$ and $R^4$, independently, is an alkyl having from 1 to 6 carbon atoms, where $Y_1$ or $Y_2$, independently, is from 0 to 20, and wherein $x_1+x_2 = 2$, wherein $x_3+x_4=2$; and wherein $x_1$, $x_2$, $x_3$, or $x_4$ is 0, 1, or 2.

A specific example of such a compound is Vircol-82 manufactured by Allbright and Wilson Corporation and has the formula

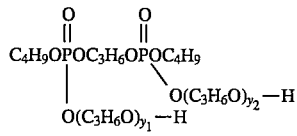

having a molecular weight of about 548 and $y_1+y_2=3.4$. Another phosphorous type compound can be represented by the formula

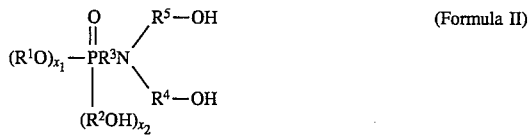 (Formula II)

wherein $R^1$, $R^2$, $R^3$, $R^4$, and $R^5$, independently, is an alkyl having from 1 to 15 carbon atoms, where $x_1+x_2=2$, and $x_m$ and $x_2$, independently, is 0, 1, or 2. A specific example of such a compound is Fyrol-6 which is manufactured by the Akzo Chemicals, Inc. Corporation and has the formula

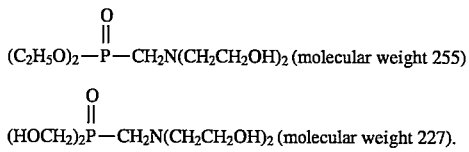

Another phosphorous type adhesion promoter is represented by the formula

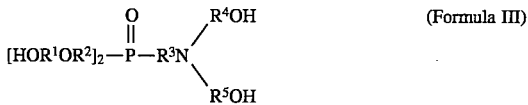 (Formula III)

wherein $R^1$, $R^2$, $R^4$, and $R^5$, independently, is an alkyl having from 1 to 8 carbon atoms, and $R^3$ is hydrogen or an alkyl having 1 to 8 carbon atoms. A specific example is

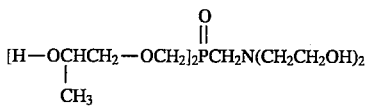

Yet another type of a phosphorous type adhesion promoter is represented by the formula

 (Formula IV)

wherein $R^1$ is an alkyl having from 1 to 8 carbon atoms, and $R^2$ is nonexistent or an alkyl having from 1 to 8 carbon atoms, and wherein x is 1, 2, or 3, and wherein y is 0, 1, or 2, and wherein x+y=3. Specific examples include

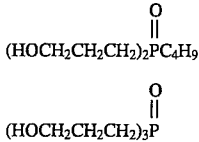

The amount of the phosphorous-containing compounds is generally from about 0 or 0.1 to about 15 percent by weight and preferably from about 0.1 or 0.5 to about 10 percent by weight based upon the total weight of the curative component or system, or from about 0.05 to about 7.5 percent by weight and preferably from about 0.25 percent to about 5 percent by weight based upon the total weight of the curative component and the prepolymer component.

As with the urethane prepolymer component, the curative component can contain various additives, pigments, dyes, fillers, and the like. Often such compounds can be utilized solely in either component, or in both components. Generally, the curative component contains significant amounts of fillers as described with regard to the urethane prepolymer component and is thus hereby fully incorporated with specific examples including talc, clay, silica, calcium carbonate, and the like. Moreover, fumed silica is often utilized in order to prevent the fillers from settling out. Various pigments and or dyes can be utilized such as those discussed hereinabove with regard to the urethane prepolymer component. Additionally, various additives depending upon desired end use can also be contained within a curative component such as antioxidants, and the like. The amount as well as the type of specific fillers, additives, etc., are well known to the art and to the literature inasmuch as they are generally the same utilized in urethane compounds or adhesives.

The various ingredients of the curative component can be generally added in any manner and mixed therewith. Inasmuch as many of the ingredients of the curative component are liquid such as the cross linking agent, the primary amine, and if used, the trimerization catalyst, the phosphorous type adhesion promoter, and the urethane catalyst. The curative component is generally a liquid and thus various non-liquid ingredients such as pigments can be readily blended therein.

The two components of the two part urethane system of the present invention are separately maintained until it is desired that a urethane adhesive be made. The urethane adhesive is made by blending the two components together utilizing any conventional mixer or blender, etc., and heating to cure the two-component system and form the urethane adhesive. The cure temperature will vary depending upon the types of ingredients of each component, but generally is from about 65.6° C. to about 149° C., and preferably from about 93° C. to about 121° C. with mixing time being generally rather small, for example, as on the order of less than 10 minutes and often from about 1 to 4 minutes.

In actual use, the two components are generally mixed together and applied to a non-treated or surface treatment free substrate, that is a primerless substrate such as the above-noted FRP substrates, metal substrates, plastic substrates, and the like. The substrates are thereafter heated to cure the system and form an adhesive bond. The two substrates together with the adhesive form a urethane adhesive composite. The adhesive may be partly or fully cured at this stage. If partly cured due to the use of short cure times or low cure temperatures, it will be post-cured in subsequent baking cycles during other processing such as paint baking. The two-component system and urethane adhesive of the present invention is particularly suitable for use in the automotive industry wherein FRP structural and appearance grade components are bonded together such as automotive hoods, doors, fenders, front ends, trunk lids, body panels, and the like. The adhesive is desirable due to enhanced thermal stability and enhanced paintability of the adhesive.

The present invention will be better understood by reference to the following examples which serve to illustrate the invention, but not to limit the same.

EXAMPLES

All parts set forth in the examples are by weight unless otherwise indicated.

Prepolymer B1

A polyurethane Prepolymer B1 was prepared using the following procedure: A ethylene oxide capped polypropylene ether triol weight average molecular weight 6000, Niax™ 31-28 having 21 wt. % polyacrylonitrile (30–40 parts by wt.) an antioxidant (0.2 parts), and fumed silica (0.5 parts) were charged to a clean, dry reactor.

The reactor and its contents were heated with stirring to 110° C. During the heating cycle, powdered talc (25 parts) was added. The reactor was heated to 70°–110° C. under vacuum for 2–3 hours to remove moisture. Then, 30–40 parts of liquid methylene bis(4-phenylisocyanate) was added. The content of the reactor was mixed for 2–3 hours at 60°–110° C. The NCO value of the final product is 2.0–3.0 meq/g and the viscosity was 6,000–12,000 cps (Brookfield Model HBTDV-II) at 25° C. using #3 spindle 20 rpm.

Prepolymer B2

Prepolymer B1 was repeated except that polyol was replaced with or an equal wt. basis with a ethylene oxide capped polypropylene ether triol nominal molecular weight 6100, Niax 34-28, with 22 wt. % 50/50 acrylonitrile/styrene. The polyurethane prepolymer was labeled Prepolymer B2.

Prepolymer B3

Prepolymer B1 was repeated except that polyol was replaced on an equal weight basis with a polypropylene ether triol of weight average molecular weight 6,000 Multranol 9151, with 21 wt. % urea.

The polyurethane prepolymer was labeled Prepolymer B3.

Prepolymer B4

Following the procedure of Prepolymer B1, a urethane Prepolymer B4 was synthesized using a ethylene oxide capped polypropylene ether triol, 6,200 molecular weight, (PolyL-385-29) (25–30 parts), antioxidant (0.2 parts), fumed silica (1.1 parts), powdered talc (24.5 parts), and liquid methylene bis (4-phenylisocyanate) (42–50 parts). The NCO value of the final product was 3.27 meq/gm.

Prepolymer B5

(Example 1 of U.S. Pat. No. 5,175,228)

Following the procedure of Prepolymer B1, a urethane Prepolymer B5 was prepared using a ethylene oxide capped polypropylene ether triol, 7,300 molecular weight, (HP-23) (29 parts), antioxidant (0.4 parts), fumed silica (0.5 parts), powdered talc (13.5 parts), molecular sieves (5 parts), and liquid methylene bis(4-phenylisocyanate) (52 parts). The NCO content of final product was 3.5 meq/gm.

Prepolymer B6

Prepolymer B5 was repeat except that polyol was replaced with another ethylene oxide capped polypropylene ether triol, 6,200 molecular weight, PolyL-385-29. The urethane prepolymer was B6. The final NCO value of B6 was 3.5 meq/gm.

Curative C1

A polyurethane Curative C1 was synthesized using the following procedure: A poly (propylene ether) tetrol of 500 molecular weight (61.5 parts), phthalocyanine blue (1.1 parts), naphthalene diamine (1.4 parts), fumed silica (0.5 parts), and antioxidant (0.2 parts), were charged to a clean, dry reactor, the reactor was heated to 110° C. while adding powdered talc (26 parts) and molecular sieves (12 parts). The slurry was heated at 70°–110° C. under vacuum for 2 hours to remove moisture. Then, tin catalyst (0.02 part) was added. It had a viscosity of 10,000–15,000 cps (Brookfield viscosity as specified earlier).

Curative C2

Curative C1 was repeated except the amount of tin catalyst was increased to (0.4 parts). The polyurethane curative was labeled C2.

Curative C3

Curative C1 was repeated except the addition of Dabco TMR, a trimerization catalyst (quaternary ammonium salt in ethylene glycol solvent) in the amount of (0.10–0.15 parts).

The polyurethane curative was labeled C3.

Curative C4

Following the procedure of Curative C1, a different Curative C4 was prepared using a polypropylene ether tetrol of 500 molecular weight (50–60 parts), phosphorus containing polyol Vircol-82 (5–10 parts), phthalocyanine blue (1 part), naphthalene diamine (1.4 parts), fumed silica (0.5 parts), antioxidant (0.2 parts), powdered talc (20 parts), molecular sieves (12 parts), and tin catalyst (0.4 parts).

Curative C5

Curative C3 was repeated except the addition of phosphorus containing polyol Vircol-82 (5–10 parts). The polyurethane curative was labeled C5.

Curative C6

Following the procedure of Curative C1, a Curative C6 was prepared using a ethylene oxide capped polypropylene ether triol (PolyL-385-29) (30–37 parts), a polypropylene ether tetrol of 500 molecular weight (30–37 parts), phthalocyanine blue (0.7 parts), naphthalene diamine (0.9 parts), fumed silica (0.8 parts), antioxidant (0.2 parts), powdered talc (21.8 parts), molecular sieves (10.2 parts), tin catalyst (0.027 parts), and Dabco TMR catalyst (0.02–0.2 parts). The OH and NH value of C6 was 2.934 meq/gm.

Curative C7

Following the procedure of Curative C1, a Curative C7 was prepared using a ethylene oxide capped polypropylene ether triol (PolyL-385-29) (32 parts), a polypropylene ether tetrol of 500 molecular weight (30–35 parts), phosphorous containing polyol (2–6 parts), phthalocyanine blue (0.75 parts), naphthalene diamine (0.9 parts), fumed silica (0.7 parts), antioxidant (0.2 parts), powdered talc (25.5 parts), molecular sieves (5 parts), tin catalyst (0.01 parts), and Dabco TMR catalyst (0.02–0.2 parts). The OH and NH value of C7 was 2.94 meq/gm.

Curative C8

(Example 2 of U.S. Pat. No. 5,175,228)

Following the procedure of Curative C1, a Curative C8 was synthesized using a polypropylene ether triol with 21 weight percent grafted acrylonitrile (Niax 31-28) (34 parts), a polypropylene ether tetrol of 500 molecular weight (28.5 parts), phthalocyanine blue (0.7 parts), naphthalene diamine (1.0 parts), fumed silica (0.4 parts), phosphorous containing polyol (8 parts), powdered talc (30–40 parts), and tin catalyst (0.25 parts). The OH and NH value of C8 was 2.6 meq/gm.

TABLE I

| Prepolymer | Polyol | Tin(urethane) Catalyst (parts) | Trimerization Catalyst (parts) | Adhesion Promoter (parts) | Equivalents of Reactive Groups/g |
|---|---|---|---|---|---|
| B1 | Niax 31-28 | — | — | — | 2.4 |
| B2 | Niax 34-28 | — | — | — | 2.37 |
| B3 | Multranol 9151 | — | — | — | 2.37 |
| B4 | 6200 MW Poly L-385-29 | — | — | — | 3.27 |
| B5 | HP-23 7300 MW | — | — | — | 3.5 |
| B6 | 6200 MW Poly L-385-29 | — | — | — | 3.5 |

TABLE II

| Curative | Polyol | Tin(urethane) Catalyst (parts) | Trimerization Catalyst (parts) | Adhesion Promoter (parts) | Equivalents of Reactive Groups/g |
|---|---|---|---|---|---|
| C1 | Tetrol 500 MW | 0.02 | — | — | 5.12 |
| C2 | Tetrol 500 MW | 0.4 | — | — | 5.12 |
| C3 | Tetrol 500 MW | 0.02 | 0.05–0.15 | — | 5.12 |
| C4 | Tetrol 500 MW | 0.4 | — | 5–10 | 4.96 |
| C5 | Tetrol 500 MW | 0.02 | 0.05–0.15 | 5–10 | 4.96 |
| C6 | Poly L-385-29 + PPO Tetrol 500 MW | 0.03 | 0.02–0.2 | — | 2.93 |
| C7 | Poly L-385-29 + PPO Tetrol 500 MW | 0.01 | 0.02–0.2 | 2–6 | 2.94 |
| C8 | Niax 31-28 + PPO Tetrol 500 MW | 0.25 | — | 8 | 2.6 |

EXAMPLE 1—ADHESIVE COMPOSITION

The polyurethane Prepolymer B1 was used with the polyurethane Curative C1, C2, C3, C4, or C5 to form the final polyurethane adhesive.

For testing of adhesive strength, standard lap shear specimens were prepared using the procedure:

Polyurethane adhesive was mixed from the specified prepolymer and the curative components in the specified NCO:(OH+NH) ratios using an adhesive meter-mixing equipment (EMC$^2$) equipped with a disposable static mixer (24 elements or more). A bead of mixed adhesive was applied along one side of FRP plaque. The plaque was placed in an aluminum fixture and a second plaque was aligned on top of the adhesive bead to give a final specimen 6"×12" with a 1"×12" overlap bonded area. The aluminum fixture was adjusted to give a standard 0.03" bond line thickness between the two plaques. The whole assembly was placed on the hot press at 270° F. (132° C.) for 2 minutes to cure the adhesive. The final specimens were placed in an air circulating oven at 300° F. (149° C.) for 30 minutes to ensure complete cure. If specified these were further aged at 400° F. (204° C.) for 60 minutes. The lap shear strength of adhesive samples were tested using an Instron type testing equipment with the cross-head speed of 0.5"/minute (1.27 cm/min.).

a. Equivalent ratio of NCO/(OH + NH) = 1.05.
Lap Shear Strength at 82° C. after post bake for 30 min. at 149° C.

| B1/C1 | B1/C2 | B1/C3 | B1/C4 | B1/C5 |
|---|---|---|---|---|
| Good | Good | Good | Good | Good |
| 519 psi[1] | 572 psi | 549 psi | 587 psi | 584 psi |
| 100 FT.[2] | 100 FT. | 97 FT. | 98 FT. | 98 FT. | b. Equivalent ratio of NCO/(OH + NH) = 1.05
Lap Shear Strength at 82° C. after post-bake for 30 min. at 149° C. + 60 min. at 204° C.

| B1/C1 | B1/C2 | B1/C3 | B1/C4 | B1/C5 |
|---|---|---|---|---|
| Fail | Degradation | Good | Fail | Good |
| 415 psi | — | 575 psi | 474 psi | 617 psi |
| 7 FT/60 CF/33 AF | | 99 FT | 56 FT/CF[3]/AF[4] | 99 FT/1 CF | c. Equivalent ratio of NCO/(OH + NH) = 1.35
Lap Shear Strength at 82° C. after post-bake for 30 min. at 149° C. and 60 min. at 204° C.

| B1/C1 | B1/C2 | B1/C3 | B1/C4 | B1/C5* |
|---|---|---|---|---|
| Good | Degradation | Good | Good | Good |
| 530 psi | — | 489 psi | 483 psi | 529 psi |
| 100 FT | | 100 FT | 91 FT | 100 FT |

[1]psi is pounds per square inch.
[2]FT is fiber tear out from the substrate.
[3]CF is cohesive failure
[4]AF is adhesive failure
*Equivalent ratio of NCO/(OH + NH) = 1.30

Example 1 showed urethane adhesive with an NCO:(OH+NH) ratio of 1.05 cured at 149° C. with any of the curatives C1–C5 gave good performance with the polyol of the base being Niax 31-28, a polypropylene triol with 21 wt. % polyacrylonitrile. Note that FT (substrate fiber tear) is desirable in these tests as it indicates the adhesive is stronger than the substrate it bonds to. When the adhesive NCO:(OH+NH) ratios of 1.05 was further post-cured at 204° C. for 60 minutes, then Curatives C3 and C5 with the trimerization catalyst gave superior results to Curatives C1, C2, and C4. When the NCO:(OH+NH) ratio was increased to 1.35, Curatives C1, C3 and C5 were better than C2 which had degradation. Curative C4 was nearly as good as C1, C3, and C5.

EXAMPLE 2

The polyurethane Prepolymer B2 was used with the polyurethane Curative C2, C3, C4, or C5 to form the final polyurethane adhesive similar to Example 1.

a. Equivalent ratio of NCO/(OH + NH) = 1.05
Lap Shear Strength at 82° C. post-baked 149° C. for 30 min.

| B2/C2 | B2/C3 | B2/C4 | B2/C5 |
|---|---|---|---|
| Good | Good | — | Good |
| 604 psi | 512 psi | | 650 psi |
| 98 FT | 99 FT | | 97 FT | b. Equivalent ratio of NCO/(OH + NH) = 1.05
Lap Shear Strength at 82° C. post-bake 149° C. + 204° C. for 60 min.

| B2/C2 | B2/C3 | B2/C4 | B2/C5 |
|---|---|---|---|
| Degradation | Fail | — | Fail |
| — | 406 psi | | 598 psi |
| | 26 FT/20 CF/54 AF | | 77 FT/23 CF | c. Equivalent ratio of NCO/(OH + NH) = 1.35
Lap Shear Strength at 82° C. post-bake 149° C. + 204° C. for 60 min.

| B2/C2 | B2/C3 | B2/C4 | B2/C5 |
|---|---|---|---|
| — | Fail | Fail | Good |
| | 422 psi | 384 psi | 615 psi |
| | 31 FT/20 CF/49 AF | 19 FT/31 CF/50 AF | 99 FT |

Example 2 showed that adhesives with an NCO:(OH+NH) ratio of 1.05 resulted in similar properties with Curatives C2–C5. When the post bake at 204° C. with an NCO:(OH+NH) ratio of 1.05 or 1.35 for 60 minutes was tested, the difference between Niax 31-28 with grafted acrylonitrile of Prepolymer B1 and Niax 34-28 of Prepolymer B2 with grafted acrylonitrile-styrene became apparent in B2/C3 which has more adhesive and cohesive failure than B1/C3 under similar heat aging. Sample B2/C5 with 60 minutes aging at 204° C. at NCO:(OH+NH) ratio of 1.05 with trimerization catalyst and phosphorous adhesion promoter showed more cohesive failure than B1/C5 under similar conditions, apparently from the switch in prepolymer polyol. When the NCO:(OH+NH) ratio was increased to 1.35 with 60 minutes aging at 204° C., the problems with B2/C3 having adhesive and cohesive failure continued. Sample B2/C4 with phosphorous adhesion promoter had problems with cohesive and adhesive failure under these conditions.

EXAMPLE 3

The polyurethane Prepolymer B3 was used with the polyurethane Curative C2, C3, C4, or C5 to form the final polyurethane adhesive similar to Example 1.

a. Equivalent ratio of NCO/(OH + NH) = 1.05
Lap Shear Strength at 82° C. post-bake 149° C. for 30 min.

| B3/C2 | B3/C3 | B3/C4 | B3/C5 |
|---|---|---|---|
| Good | Good | — | Good |
| 574 psi | 550 psi | | 598 psi |

-continued

| 96 FT | 99 FT | 97 FT |
|---|---|---| b. Equivalent ratio of NCO/(OH + NH) = 1.05
Lap Shear Strength at 82° C. post-bake at 149° C. for 30 min. +
204° C. for 60 min.

| B3/C2 | B3/C3 | B3/C4 | B3/C5 |
|---|---|---|---|
| Degradation | Good | — | Good |
| — | 653 psi | — | 616 psi |
|  | 86 FT/14 CF |  | 93 FT | c. Equivalent ratio of NCO/(OH + NH) = 1.35
Lap Shear Strength at 82° C. post-bake 149° C. + post-bake at
204° C. for 60 min.

| B3/C2 | B3/C3 | B3/C4 | B3/C5 |
|---|---|---|---|
| — | Good | Degradation | Good |
| — | 569 psi | — | 628 psi |
|  | 98 FT/2 CF |  | 99 FT |

Example 3 showed an adhesive with a NCO:(OH+NH) ratio of 1.05 resulted in similar properties irrespective of the curative when post baked at 149° C. for 30 minutes. When the post bake included 204° C. for 60 minutes, Curative C3 with trimerization catalyst resulted in 86% fiber tear and 14% cohesive failure while Curative C5 with both trimerization catalyst and phosphorus adhesion promoter resulted in 93% fiber tear. When the NCO:(OH+NH) ratio was increased to 1.35, both Curatives C3 and C5 gave good results with Prepolymer B3 while C4 resulted in degradation.

Based on Examples 1–3 the order of performance on primerless adhesion and high temperature resistance are as follows:
Prepolymer B1>B3>B2
Curative C5>C3>C4>C2 while
C3, C5 are more desirable.

EXAMPLE 4

System B1/C4, a preferred embodiment, was chosen to compare with the prior art system B5/C8 (Ex. 1 and 2 of U.S. Pat. No. 5,175,228). System B1/C4 exhibited better performance in the area of primerless adhesion and high temperature resistance than system B5/C8 of the prior art.

System B1/C4 has as the exclusive polyol of the prepolymer (also referred to as base of the adhesive when referring to the formulated component) Niax™ 31-28. System B5/C8 has Niax™ 31-28 as a portion of the polyol in the curative. The presence of Niax™ 31-28 in the curative as a partial replacement for a tetrafunctional polyol does not give resistance to high temperature aging to B5/C8 as the Niax™ 31-28 in the prepolymer base does in B1/C4 at a NCO:(OH+NH) ratio of 1.35.

EXAMPLE 5

C5 is the most preferred curative. When Niax 31-28 in B1 was selected to react with Curative C5, it showed good performance in the primerless adhesion evaluation and had high temperature stability when the equivalent ratio of NCO/(OH+NH) is below than 1.0.

| System | B1/C4 | | | B5/C8* → | | |
|---|---|---|---|---|---|---|
| Equiv. Ratio of NCO/(OH + NH) | 1.05 | 1.05 | 1.35 | 1.05 | 1.05 | 1.35 |
| Polyol in Prepolymer | Niax 31-28 → | | | HP-23 → | | |
| Polyol in Curative besides Tetrol | None → | | | Niax 31-28 → | | |
| Phosphorous Polyol | Yes → | | | | | |
| Trimerization Catalyst | None → | | | | | |
| Post-Bake Lap Shear Strength at 82° C. | 300° F., 30' Good 587 psi 98 FT | (300° F., 30' + 400° F., 60') Fail 474 psi 56 FT/CF/AF | 300° F., 30' Good 483 psi 91 FT | 300° F., 30' Fail 396 psi 77 FT/23 AF | (300° F., 30' + 400° F., 60') Fail 292 psi 100 CF | Fail 378 psi 8 FT/87 CF/5 AF |

System B5/C8 is Examples 1 and 2 of U.S. Pat. No. 5,175,228

|  | a. System B1/B5 | | | | | |
|---|---|---|---|---|---|---|
| Equiv. Ratio of NCO/(OH + NH) | 0.95 | 1.01 | 1.05 | 0.95 | 1.01 | 1.05 |
| Polyol in Prepolymer | Niax 31-28 ——————————————→ | | | | | |
| Polyol in Curative besides Tetrol | None ———————————————→ | | | | | |
| Phosphorous Polyol | Yes ————————————————→ | | | | | |
| Trimerization Catalyst | Yes ————————————————→ | | | | | |
| Post-Bake | 149° C., 30' ————→ | | | 149° C., 30' + 204° C., 60' | | |
| Lap Shear Strength at 82° C. | 390 psi 97 FT | 427 psi 93 FT | 584 psi 98 FT | 418 psi 89 FT/ CF | 412 psi 97 FT/ CF | 617 psi 99 FT/ CF |

EXAMPLE 6

For testing of paint adhesion to the urethane adhesive, the test method comprises the following steps.

a) apply a thin layer, 15–20 mils (0.038–0.051 cm.), of mixed adhesive on the surface of fiberglass reinforced plastic and cure it at 149° C. for 10 minutes, b) wash with de-ionized water and bake at 88° C. for 20 minutes, c) prime with Seibert-Oxidermo® BP 2349 MD conductive primer, d) flush for 30 minutes, and then bake for 30 minutes @ 149° C. Cross-hatch test for paint adhesion with a test such as GM 9071 method A or Ford B16-1.

The existence of a polypropylene polyols such as HP-23 or PolyL-385-29 in the Prepolymer or Curative caused paint adhesion failure. Prepolymer B1 was reacted with Curative C2–C5 in order to study the effect of Niax 31-28, phosphorous polyols, and trimerization catalysts on paint adhesion. It showed the presence of Niax 31-28 and trimerization catalysts contributed paint adhesion significantly.

primerless adhesion and high temperature resistance of urethane adhesives. System B1/C5 still maintained good primerless adhesion even the equivalent ratio of NCO/(OH+NH) was decreased to 0.7.

| System | B1/C2 | B1/C3 | B1/C4 | B1/C5 | B1/C5 |
|---|---|---|---|---|---|
| Equiv. Ratio of NCO/OH + NH | 1.35 | 1.35 | 1.35 | 1.35 | 1.06 |
| Polyol in Prepolymer | Niax 31-28 | Niax 31-28 | Niax 31-28 | Niax 31-28 | Niax 31-28 |
| Polyol in Curative beside Tetrol | None | None | None | None | None |
| Phosphorous Polyol | None | None | Yes | Yes | Yes |
| Trimerization Catalyst | None | 0.05–0.15 | None | 0.05–0.15 | 0.05–0.15 |
| Paint Adhesion Test | 25% Failure | 2% Failure | 56% Failure | 0% Failure | 0% Failure |

| System | B4/C6 | B4/C7 | B5/C8* | B6/C8 |
|---|---|---|---|---|
| Equiv. Ratio of NCO/OH + NH | 1.59 | 1.1 | 1.35 | 1.35 |
| Polyol in Prepolymer | PolyL-385-29 | PolyL-385-29 | HP-23 | PolyL-385-29 |
| Polyol in Curative beside Tetrol | PolyL-385-29 | PolyL-385-29 | Niax 31-28 | Niax 31-28 |
| Phosphorous Polyol | None | Yes | Yes | Yes |
| Trimerization Catalyst | Yes | Yes | None | None |
| Paint Adhesion Test | 100% Failure | 100% Failure | 100% Failure | 100% Failure |

*Examples 1 and 2 of U.S. Pat. No. 5,175,228

EXAMPLE 7

For System B1/C5 having phosphorous polyol and trimerization catalyst, several low equivalent ratios of NCO/(OH+NH) were chosen in order to study the effect on a. System B1/C5

| | | | | |
|---|---|---|---|---|
| Equiv. Ratio of NCO/(OH + NH) | 0.88 | 0.84 | 0.8 | 0.75 |
| Post-Bake | 149° C., 30 min. ———————→ | | | |
| Lap Shear Strength at 82° C. | 413 psi 79 FT/ AF | 413 psi 81 FT/ AF | 447 psi 98 FT/6 CF | 494 psi 89 FT/6 CF/5 AF | b. System B1/C5

| | | | |
|---|---|---|---|
| Equiv. Ratio of NCO/(OH + NH) | 0.7 | 0.65 | 0.6 |
| Post-Bake | 149° C., 30 min. ———————→ | | |
| Lap Shear Strength at 82° C. | 426 psi 72 FT/AF | 368 psi 15 FT/AF | 444 psi 23 FT/CF |

The high temperature resistance of System B1/C5 was retained until the equivalent ratio of NCO/(OH+NH) was below 0.8.

c. System B1/C5

| | | | | |
|---|---|---|---|---|
| Equiv. Ratio of NCO/(OH + NH) | 0.88 | 0.84 | 0.8 | 0.75 |
| Post-Bake | 149° C., 30 min. + 204° C. 60 min. ————→ | | | |
| Lap Shear Strength at 82° C. | 475 psi 68 FT/ AF | 423 psi 54 FT/ AF | 470 psi 57 FT/ CF | 398 psi 7 FT/CF |

While in accordance with the patent statutes the best mode and preferred embodiment has been set forth, the scope of the invention is not limited thereto, but rather by the scope of the attached claims.

What is claimed is:

1. In a polyurethane composition comprising:
   an isocyanate terminated prepolymer component comprising the reaction product of one or more polyols and one or more polyisocyanates and
   a curative component comprising one or more polyol curing agents, having sufficient hydroxyl functionality to form a crosslinked composition when reacted with said isocyanate terminated prepolymer component, and optionally one or more polyamines
   the improvement wherein at least 80 wt. % of said one or more polyols used to make said isocyanate terminated prepolymer component are one or more grafted poly(alkylene oxide) polyols formed from grafting reactions of poly(alkylene oxide) polyols with ethylenically unsaturated monomers comprising acrylonitrile, said acrylonitrile being at least 80 wt. % of said unsaturated monomers and wherein said poly(alkylene oxide) polyols have an average functionality of at least 2, wherein the isocyanate terminated prepolymer component has NCO groups and the curative component has OH and optionally NH groups, and wherein said composition is free of latent catalysts.

2. In a polyurethane composition according to claim 1, wherein said grafted poly(alkylene oxide) polyols comprise from 5 to 40 wt. % repeat units from acrylonitrile, wherein a preponderance of the hydroxyls of said grafted polyols are hydroxyls on primary carbon atoms, and wherein said NCO groups of said prepolymer are present in a ratio of from about 0.6 to about 2.0 to the combined amount of OH and optional NH groups of said curative component.

3. In a polyurethane composition according to claim 2, wherein said grafted polyols have number average molecular weights from about 1,000 to about 10,000, wherein said grafted polyols are at least 90 wt. % of the polyols used to make the prepolymer component, wherein said polyisocyanates and polyols are present in such ratios that the NCO:(OH+NH) in said polyurethane composition is from 0.75 to less than 1.2, and wherein said composition includes one or more trimerization catalysts in an amount from about 0.01 to about 1.0 percent by weight based upon the total weight of the curative component.

4. In a polyurethane composition according to claim 3, wherein said one or more trimerization catalysts comprises a quaternary ammonium carboxylate of the formula

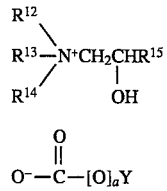

where a is 0 or 1, where $R^{12}$, $R^{13}$, $R^{14}$, independently, is alkyl or hydroxyalkyl of $C_{1-20}$, cycloalkyl of $C_{3-8}$, aralkyl, aryl, alkenyl of $C_{2-20}$, or alkynyl of $C_{2-6}$; $R^{15}$ is H, phenyl, alkyl of $C_{1-15}$, alkenyl of $C_{2-15}$, or alkynyl of $C_{2-6}$, hydroxy alkyl of $C_{1-9}$, ketoalkyl of $C_{3-15}$, or alkoxy alkyl of $C_{2-20}$; and where Y is H, alkyl of $C_{1-18}$, alkenyl of $C_{2-15}$, or aromatic of $C_6$ to $C_{20}$.

5. In a polyurethane composition according to claim 4, wherein said composition further comprises talc and wherein said ethylenically unsaturated monomers are at least 90 weight percent acrylonitrile.

6. In a polyurethane composition according to claim 5 further comprising one or more phosphorus based adhesion promoters.

7. In a polyurethane composition according to claim 6, wherein said phosphorus based adhesion promoters are present from 0.1 to 15 wt. % based on the curative component.

8. In a polyurethane composition according to claim 3, further comprising one or more phosphorus based adhesion promoters in amounts from 0.1 to 15 wt. % based upon the curative component.

9. In a method for using a polyol for making a reactive polyurethane composition, said method comprising forming a prepolymer component and forming a curative component, having sufficient hydroxyl functionality to result in a crosslinked polyurethane when reacted with said prepolymer component, said prepolymer component comprising the reaction product of one or more polyols with an average functionality of 2 or more reacted with one or more polyisocyanates, said curative comprising one or more polyol curatives and optionally one or more polyamines,
   the improvement wherein the one or more polyols used to make the prepolymer component comprise at least 80 weight percent grafted poly(alkylene oxide) polyols, said grafted polyols being formed by a grafting reaction of monomers at least 80 wt. % of which is acrylonitrile with poly(alkylene oxide) polyols, and wherein said prepolymer component has isocyanate groups and said curative component has hydroxyl groups and optionally amine groups.

10. In a method according to claim 9, wherein said grafted poly(alkylene oxide) polyols comprise 5 to 40 wt. % repeat units from acrylonitrile, said monomers comprise at least 80 wt. % acrylonitrile, and wherein said polyurethane composition further includes from about 0.01 to about 1.0 percent by weight of a trimerization catalyst based on the total weight of the curative component.

11. In a method according to claim 10, wherein said grafted poly(alkylene oxide) polyols had number average molecular weights between 1,000 and 10,000.

12. In a method according to claim 11, wherein said polyisocyanates, said polyols, and said optional polyamines are present in ratios such that the reactive polyurethane composition has an NCO:(OH+NH) ratio from 0.75 to less than 1.2 and wherein said trimerization catalyst comprises a quaternary ammonium carboxylate having the formula

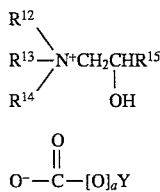

where a is 0 or 1, where $R^{12}$, $R^{13}$, $R^{14}$, independently, is alkyl or hydroxyalkyl of $C_{1-20}$, cycloalkyl of $C_{3-8}$, aralkyl, aryl, alkenyl of $C_{2-20}$, or alkynyl of $C_{2-6}$; $R^{15}$ is H, phenyl, alkyl of $C_{1-15}$, alkenyl of $C_{2-15}$, alkynyl of $C_{2-6}$, hydroxy alkyl of $C_{1-9}$, ketoalkyl of $C_{3-15}$, or alkoxy alkyl of $C_{2-20}$; and where Y is H, alkyl of $C_{1-18}$, alkenyl of $C_{2-15}$, or aromatic of $C_6$ to $C_{20}$.

13. In a method according to claim 12, wherein said monomers are at least 90 weight percent acrylonitrile and the amount of said trimerization catalyst is from about 0.02 to about 0.5 weight percent based on the curative component.

14. In a method according to claim 13, wherein the composition further comprises one or more phosphorus based adhesion promoters in amounts from 0.1 to 15 wt. % based on the curative component.

15. In a laminate comprising a cured urethane adhesive interposed between two or more substrates, said urethane adhesive prior to curing comprising:

a prepolymer component comprising one or more isocyanate terminated polymers resulting from the reaction of one or more polyisocyanates with one or more polyols, and a curative component comprising one or more polyol curing agents and optionally one or more polyamines, the improvement wherein at least 80 weight percent of the polyols used in the prepolymer component are one or more grafted poly(alkylene oxide) polyols made by reacting a poly(alkylene oxide) polyol with at least one ethylenically unsaturated monomer at least 80 wt. % of which is acrylonitrile, and wherein said isocyanate terminated polymers have isocyanate groups and said polyol curing agents have hydroxyl groups.

16. In a laminate according to claim 15, wherein the isocyanate terminated polymers and polyol curing agents are present in such ratios that the ratio of NCO:(OH+NH) groups of said urethane adhesive is from 0.6 to less than 1.2 and said adhesive further comprises a trimerization catalyst in an amount of from about 0.01 to about 1 wt. % based on the total weight of curative.

17. In a laminate according to claim 16, wherein said grafted poly(alkylene oxide) polyols comprise from 5 to 40 wt. % repeat units from acrylonitrile, wherein a preponderance of the hydroxyl groups of said grafted polyols are hydroxyls on primary carbon atoms, and wherein said ethylenically unsaturated monomers are at least 80 wt. % acrylonitrile.

18. In a laminate according to claim 17, wherein said grafted poly(alkylene oxide) polyols have a number average molecular weight from about 1,000 to about 10,000, said ethylenically unsaturated monomers are at least 90 weight percent acrylonitrile, and wherein said grafted polyols are at least 90 wt. % of the polyols used to make the prepolymer components, and wherein said trimerization catalyst comprises one or more quaternary ammonium carboxylate having the formula

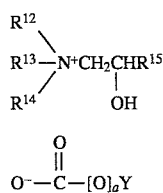

where a is 0 or 1, where $R^{12}$, $R^{13}$, $R^{14}$, independently, is alkyl or hydroxyalkyl of $C_{1-20}$, cycloalkyl of $C_{3-8}$, aralkyl, aryl, alkenyl of $C_{2-20}$, or alkynyl of $C_{2-6}$; $R^{15}$ is H, phenyl, alkyl of $C_{1-15}$, alkenyl of $C_{2-15}$, alkynyl of $C_{2-6}$, hydroxy alkyl of $C_{1-9}$, ketoalkyl of $C_{3-15}$, or alkoxy alkyl of $C_{2-20}$; and where Y is H, alkyl of $C_{1-18}$, alkenyl of $C_{2-15}$, or aromatic of $C_6$ to $C_{20}$.

19. In a laminate according to claim 17, wherein at least one of said two or more substrates is a fiber reinforced thermoset plastic and said laminate further comprises a paint comprising a powder coating on said at least one fiber reinforced thermoset plastic substrate.

20. In an article comprising two fiber reinforced plastic substrates adhered to one another by a urethane adhesive which adhesive prior to curing comprises an NCO terminated prepolymer and a OH terminated polymer, wherein at least one surface of said article has been powder coated and baked after said urethane adhesive is cured, the improvement wherein (a) said adhesive prior to curing has an NCO:(OH+NH) ratio of from 0.6 to less than 1.2, (b) said prepolymer is the reaction product of a polyisocyanate and a polyol, and (c) at least 80 weight percent of said polyol is a polyol grafted with at least one ethylenically unsaturated monomer, wherein at least 80 wt. % of said at least one unsaturated monomer is acrylonitrile.

21. In an article as set forth in claim 20, wherein the NCO:(OH+NH) ratio is from about 0.8 to 1.1 and wherein said at least one ethylenically unsaturated monomer is at least 80 wt. % acrylonitrile monomer.

* * * * *